Oct. 17, 1967  J. R. CIELO  3,348,124
SPLIT PRIMARY INVERTER
Filed Dec. 31, 1964

INVENTOR
JOHN R. CIELO

BY Earl C. Hancock
ATTORNEY

United States Patent Office 3,348,124
Patented Oct. 17, 1967

3,348,124
SPLIT PRIMARY INVERTER
John R. Cielo, West Hurley, N.Y., assignor to International Business Machines Corporation, Armonk, N.Y., a corporation of New York
Filed Dec. 31, 1964, Ser. No. 422,681
3 Claims. (Cl. 321—45)

ABSTRACT OF THE DISCLOSURE

Inverter connected controlled rectifiers are commutated out of conduction by commutating controlled rectifiers which share a common resonant circuit. The output is energized through a split primary transformer with the commutating rectifiers connected to the sections of the split primary so that the resonant circuit charges in proportion to the output load current.

This invention relates to inverter circuits which produce alternating output pulses from an input power source which is generally a direct current supply. More particularly, this invention relates to inverter circuits which utilize a pair of main controlled rectifier elements for alternately energizing a load and a pair of controlled rectifier commutating circuits for extinguishing the conduction of the main controlled rectifiers.

Controlled rectifiers such as the silicon controlled rectifier are frequently being utilized in inverter circuits because of the relatvely high power handling capabilities of these devices. Several problems have been encountered in employing controlled rectifiers for these applications, however, and one of the most bothersome of these difficulties is the so called $dv/dt$ problem. That is, these rectifiers will tend to conduct despite the absence of a conduction gate at the control electrode thereof if a forward potential between the anode and cathode is applied to suddenly. Another problem frequently encountered with controlled rectifiers is that, once they are conducting, merely removing the conduction gate or even applying a negative gate to the control electrode will not extinguish forward conduction therethrough and some means of temporarily removing the forward potential between the anode and cathode is needed. An inverter arrangement wherein commutation of a pair of main controlled rectifiers is accomplished by a common commutating capacitor resonating with individual inductors in series with the two commutating control rectifiers is revealed in copending application Ser. No. 380,531 and now Patent No. 3,315,145 entitled "Inverter With Improved Commutation Operation" by Edward A. Menard which application is assigned to the same assignee as the present application. Another arrangement for overcoming the aforementioned problems is revealed in copending application Ser. No. 400,712, filed Oct. 1, 1964, entitled, "Power Inverter," by John R. Cielo which is also assigned to the same assignee as the present application.

Prior inverter circuits utilizing commutation arrangements frequently failed to provide commutation current which is proportional to the load current thus rendering commutation uncertain in the presence of a varying load. Often the prior inverter circuits required that fuses be utilized instead of circuit breakers with the inherent maintenance difficulties associated therewith. The present invention provides a circuit arrangement for inverter operation wherein commutating current is maintained proportional to load current with a minimum of power drain for commutation operations while permitting utilization of circuit breakers for overload protection. In addition, the present invention substantially overcomes the $dv/dt$ problem.

The present invention advantageously utilizes a pair of main controlled rectifiers for alternately introducing energization pulses to respective primary windings of a split primary output transformer. The circuitry is provided with operating power from a three terminal power source with commutation for the main controlled rectifiers being provided by two commutating circuits. Each commutating circuit includes an individual controlled rectifier connected in series with a common resonant circuit and is coupled in parallel with the main controlled rectifier. By appropriately timing the conduction gates introduced to all of these controlled rectifiers, the resonant circuit will be charged while one main controlled rectifier is conducting, discharged in such a manner as to extinguish conduction of that controlled rectifier and recharged in the opposite direction while the other main rectifier conducts. By the configuration in accordance with this invention, not only is commutation of the main controlled rectifiers assured but additionally the split primary transformer will reduce the sensitivity of both the main controlled rectifiers and the commutating controlled rectifiers to the $dv/dt$ problem. Further, this arrangement insures that the commutating current will be proportional to the load current thus making the circuit relatively insensitive to variations in load.

Therefore, it is an object of the present invention to provide an improved inverter circuit utilizing controlled rectifier elements for main current flow and for commutation purposes.

It is another object of the present invention to provide an improved inverter circuit wherein the commutation charge is maintained relatively proportional to the load current.

It is still another object of the present invention to provide an inverter circuit capable of introducing the full input potential to the output circuit during each complete cycle of operation.

It is yet another object of the present invention to provide an inverter circuit which can be protected from overload conditions by utilizing circuit breakers.

Yet another object of the present invention is to provide an inverter circuit utilizing controlled rectifier elements for the main current control and for commutation with these elements being relatively insensitive to the $dv/dt$ problem.

Another object of the present invention is to provide an inverter circuit wherein the main controlled rectifier elements are automatically removed from conduction simply by removal of the gate signals thereof.

The foregoing and other objects, features and advantages of the present invention will be apparent from the following more particular description of preferred embodiments of the invention as illustrated in the accompanying drawings in which.

Figure 1:
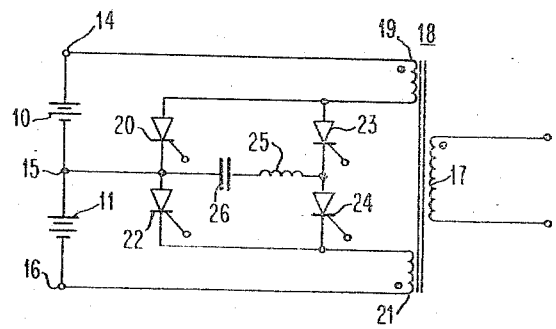
FIG. 1 is an illustration of the basic circuitry of the present invention.

The fundamental circuitry in accordance with the present invention is illustrated in FIGURE 1. Although two power sources 10 and 11 are included for the purpose of energizing terminals 14, 15 and 16, this arrangement is here shown for exemplary purposes only and any means for producing a potential at terminal 14 which is positive with respect to terminal 15 and a potential at terminal 15 that is positive with respect to 16 can be satisfactorily employed.

The primary purpose of the circuitry is to convert the DC potential from the power source such as 10 and 11 into a pulsating AC potential at the output of transformer 18. This is accomplished by energizing primary winding 19 from main controlled rectifier 20 and alternately energizing primary winding 21 by main controlled rectifier 22. To insure that current conduction through rectifiers 20 and 22 is extinguished, commutating controlled rectifiers 23 and 24 are included for operating in conjunction with a resonant circuit here shown as series inductance 25 and capacitance 26. Operation of the circuitry will now be described in greater detail.

Figure 2:
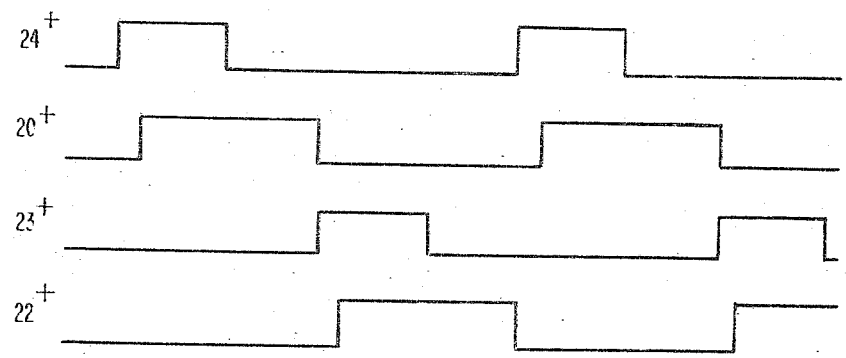
FIG. 2 is a time base diagram of the gate signals utilized for operating circuitry in accordance with the present invention.

A device for producing conduction gates to be introduced to the controlled rectifiers produces these gates in the timing relationship shown in FIGURE 2. Such gating devices are well known in the art and are omitted here in the interests of brevity. Preferably the initial gate which would commence operation of the inverter would be introduced to one or the other of the commutating controlled rectifiers 23 and 24. For purposes of illustration, the initial gate is shown being introduced to control rectifier 24 which thereby permits capacitor 26 to charge with a positive potential on the left plate thereof in proportion to the potential at source 11. Immediately thereafter, main rectifier 20 is gated into conduction and the main output current flows through primary winding 19 at a potential determined by source 10. Because of transformer action between windings 19 and 21, the charge on capacitor 26 will be further increased in proportion to the load current passing through winding 19. One half of a cycle later, the conduction gate is removed from rectifier 20 and commutation controlled rectifier 23 is gated into conduction. This results in the charge on capacitor 26 being applied in conduction extinguishing direction across main controlled rectifier 20. The charge on capacitor 26 will then reverse towards a potential equal to the voltage available at source 10 but with the right plate of 26 being positive. Shortly thereafter, main controlled rectifier 22 is gated into conduction thus causing load current to flow through winding 21 which, again because of transformer action between windings 21 and 19, will result in augmentation of the charge on capacitor 26 in proportion to the load current but of opposite polarity with respect to the first half cycle. Subsequently, the conduction gate is removed from rectifier 22 and applied to rectifier 24 which results in the current condition of rectifier 22 being extinguished thus completing the second half cycle. By this arrangement, one full cycle of pulsating power will have been introduced to the output winding 17 in transformer 18. Note that it is the fact that the commutating controlled rectifiers 23 and 24 are kept in conduction for at least brief periods after main rectifiers 20 and 22 are gated or which insures that the charge acquired by capacitor 26 will be proportional to the load current. Thus the circuit is excellent for handling brief overloads without loss of commutation.

To stop the inverter operation, all that need be done is remove the conduction gates from main rectifiers 20 and 22 and rectifiers 23 and 24 will thereafter insure that current conduction through the main rectifiers will cease. Note that, if desired, the gates could change from a positive to a negative level or simply vary between zero and a positive level.

Figure 3:
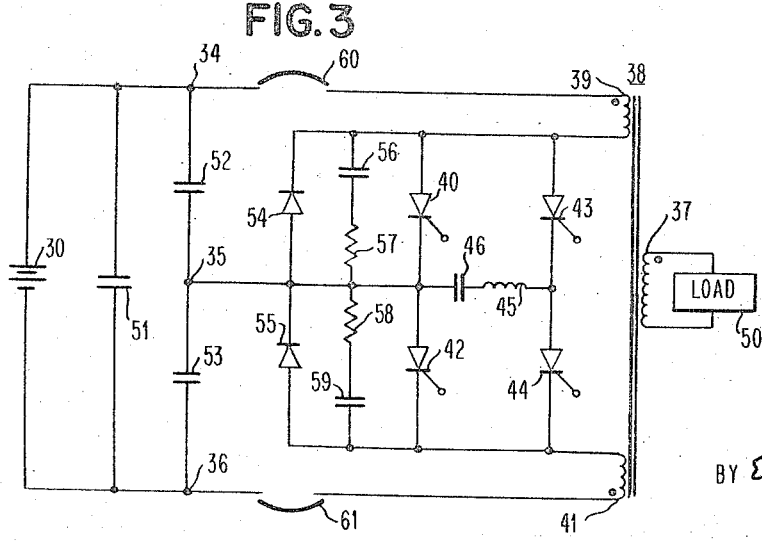
FIG. 3 is another embodiment of the present invention including several additional features and illustrating the applicability of a two-terminal power source thereto.

FIGURE 3 shows an inverter in accordance with the present invention including several advantageous features. The operation and timing of conduction gates for main controlled rectifiers 40 and 42 along with commutating controlled rectifiers 43 and 44 is substantially the same as has been described hereinbefore for FIGURES 1 and 2. That is, pulsed output signals are introduced to load 50 by alternate main current flow through primary windings 39 and 41. However, note that the FIGURE 3 circuitry is energized by a single power source 30 with capacitors 51, 52 and 53 arranged to produce the effect of one-half the potential of 30 appearing between terminals 34 and 35 and also between 35 and 36.

Diodes 54 and 55 are included in the FIGURE 3 circuitry for the purpose of facilitating discharge of capacitor 46. This has the effect of increasing the maximum operating frequency for the circuit since capacitor 46 does not have to discharge through the power source. Diodes 54 and 55 also provide a primary current path in the event that the load power factor is other than unity. The networks made up of resistors 57 and 58 and capacitors 56 and 59 can also be included to reduce the rate of rise of applied forward potential across main rectifiers 40 and 42 thereby further alleviating the sensitivity of the circuit to unintended $dv/dt$ conduction. Similar R–C networks could be included for commutating rectifiers 43 and 44 as needed, of course. Further, the simple arrangement possible for overload protection is shown in FIGURE 3 with the circuit breaker contacts 60 and 61. Of course a single breaker in series with source 30 could be utilized for protection if desired.

While the invention has been particularly shown and described with reference to the preferred embodiments thereof, it will be understood by those skilled in the art that various changes in form and details may be made therein without departing from the spirit and scope of this invention.

What is claimed is:

1. An inverter circuit comprising
   an output transformer having first and second primary windings,
   power source means having first, second and third terminals with the potential at said first terminal being positive with respect to said second terminal and the potential at said second terminal being positive with respect to said third terminal,
   a first main controlled rectifier connected in series with said first primary winding across said first and second terminals for providing a forward conduction path therebetween,
   a second main controlled rectifier connected in series with said second primary winding across said second and third terminals for providing a forward conduction path therebetween,
   a series resonant circuit means connected on one side to said second terminal,
   first and second commutating controlled rectifiers commonly connected to the other side of said resonant circuit means for providing first and second commutating circuits, said first and second commutating circuits being coupled across said first and second main controlled rectifiers, respectively, in the same current conduction relation as the said main controlled rectifier thus associated therewith,
   first and second diode means connected across said first and second main controlled rectifiers, respectively, for presenting low impedance discharge paths for said series resonant circuit, and
   means for initiating operation of said inverter circuit by introducing a conduction gate to one of said commutating control rectifiers and for thereafter cyclically applying and removing conduction gates to said controlled rectifiers so that operation of said resonant circuit means will alternately extinguish conduction of said main controlled rectifiers.

2. An inverter in accordance with claim 1 which includes first and second series resistor-capacitor networks connected in parallel with said first and second main controlled rectifiers, respectively.

3. An inverter circuit in accordance with claim 1 wherein said gating means is arranged for causing conduction of said first commutating rectifier to at least partially overlap conduction of said second main rectifier and for causing conduction of said second commutating rectifier to at least partially overlap conduction of said first main rectifier.

References Cited

UNITED STATES PATENTS

| | | | |
|---|---|---|---|
| 3,085,190 | 4/1963 | Kearns et al. | 321—45 |
| 3,164,767 | 1/1965 | Morgan | 321—45 X |
| 3,181,053 | 4/1965 | Amato | 321—45 |
| 3,207,974 | 9/1965 | McMurray | 321—45 |
| 3,213,287 | 10/1965 | King | 307—71 |
| 3,286,155 | 11/1966 | Corey | 321—45 |
| 3,303,407 | 2/1967 | Depenbrock et al. | 321—45 |

JOHN F. COUCH, *Primary Examiner.*

WM. SHOOP, *Assistant Examiner.*